(12) United States Patent
Martin et al.

(10) Patent No.: US 8,307,410 B2
(45) Date of Patent: Nov. 6, 2012

(54) SYSTEMS, METHODS, AND COMPUTER READABLE MEDIA FOR PROVIDING FOR SECURE OFFLINE DATA TRANSFER BETWEEN WIRELESS SMART DEVICES

(75) Inventors: Philippe Martin, San Jose, CA (US);
Ming-Li Liu, Menlo Park, CA (US);
Roshan Vijayshankar, Santa Clara, CA (US); Pradeep Kumar, Fremont, CA (US)

(73) Assignee: MasterCard International Incorporated, Purchase, NY (US)

( * ) Notice: Subject to any disclaimer, the term of this patent is extended or adjusted under 35 U.S.C. 154(b) by 837 days.

(21) Appl. No.: 12/190,558

(22) Filed: Aug. 12, 2008

(65) Prior Publication Data

US 2010/0043061 A1 Feb. 18, 2010

(51) Int. Cl.
*G06F 7/04* (2006.01)
*G06F 15/16* (2006.01)

(52) U.S. Cl. ............... 726/4; 726/17; 726/26; 380/259; 380/279

(58) Field of Classification Search ........................ None
See application file for complete search history.

(56) References Cited

U.S. PATENT DOCUMENTS

| | | | |
|---|---|---|---|
| 7,721,088 B2 * | 5/2010 | Okamoto et al. | 713/157 |
| 2002/0095386 A1 * | 7/2002 | Maritzen et al. | 705/64 |
| 2004/0059685 A1 | 3/2004 | Sakamura et al. | |
| 2005/0044361 A1 | 2/2005 | Chang et al. | |
| 2005/0131761 A1 | 6/2005 | Trika et al. | |
| 2006/0000900 A1 * | 1/2006 | Fernandes et al. | 235/380 |
| 2006/0294585 A1 * | 12/2006 | Sadovsky et al. | 726/17 |
| 2007/0061886 A1 * | 3/2007 | Le | 726/26 |

(Continued)

FOREIGN PATENT DOCUMENTS

WO WO 2010/019668 A2 2/2010

OTHER PUBLICATIONS

Notification of Transmittal of the International Search Report and the Written Opinion of the International Searching Authority, or the Declaration for International Application No. PCT/US2009/053554 (Apr. 20, 2010).

(Continued)

*Primary Examiner* — Shewaye Gelagay
(74) *Attorney, Agent, or Firm* — Jenkins, Wilson, Taylor & Hunt, P.A.

(57) ABSTRACT

According to one aspect of the subject matter described herein, a method for registering wireless smart devices for secure offline data transfer is provided. The method includes, for an application configured to execute on a wireless smart device and that requires access to information regarding an account that does not reside on the wireless smart device, register, at a server having access to the information regarding the account, a first wireless smart device has an account owner device (AOD) for operating in an online mode for obtaining the information regarding the account from the server and for operating in an offline mode for transferring the information regarding the account to at least one additional device via a secure offline data transfer using near field communications (NFC). The method further includes registering, at the server, at least one second wireless smart device as an account sharer device (ASD) for operating in an offline mode for receiving the information regarding the account from the first wireless smart device via the secure offline data transfer using NFC.

14 Claims, 6 Drawing Sheets

U.S. PATENT DOCUMENTS

2007/0299780 A1* 12/2007 Vanska et al. .................. 705/59
2008/0222711 A1* 9/2008 Michaelis ......................... 726/7
2008/0256646 A1* 10/2008 Strom et al. ..................... 726/29

OTHER PUBLICATIONS

"FeliCa," Wikipedia, pp. 1-6 (Downloaded from the Internet on May 12, 2011).

ECMA International, "Near Field Communication Interface and Protocol (NFCIP-1)," ECMA-340 $2^{nd}$ Edition, pp. 1-65 (Dec. 2004).

Baddeley (ed.), "Identification Cards—Contactless Integrated Circuit(s) Cards—Proximity Cards; Part 3: Initialization and Anticollision," ISO/IEC 14443-3, pp. 1-48 (Jun. 11, 1999).

Baddeley (ed.), "Identification Cards—Contactless Integrated Circuit(s) Cards—Proximity Cards; Part 2: Radio Frequency Power and Signal Interface," ISO/IEC 14443-2, pp. 1-16 (Mar. 26, 1999).

* cited by examiner

SYSTEMS, METHODS, AND COMPUTER READABLE MEDIA FOR PROVIDING FOR SECURE OFFLINE DATA TRANSFER BETWEEN WIRELESS SMART DEVICES

TECHNICAL FIELD

The subject matter described herein relates to wireless smart devices. More particularly, the subject matter described herein relates to systems, methods, and computer readable media for providing for secure offline data transfer between wireless smart devices.

BACKGROUND

With the success and widespread use of wireless smart devices, banks and financial institutions have turned to wireless smart devices as a means to provide customers with access to credit card accounts, debit card accounts, and other types of accounts. As used herein, the term "wireless smart device" refers to a device with processing capabilities that can communicate wirelessly via an electric and/or magnetic field with other devices, including either cellular communications nodes (i.e., base stations) or near field communication devices (i.e., contactless card readers or other wireless smart devices). The wireless smart device may be equipped with an on-board memory and processing capabilities and may contain one or more applications that perform different functions, such as effecting contactless payment and loyalty transactions. Examples of wireless smart devices include contactless cards, contactless fobs, and mobile phones or personal digital assistants (PDAs) provisioned with soft cards.

As stated above, in order to communicate wirelessly with other devices, wireless smart devices may utilize near field communications (NFC). Near field communications enable the exchange of data between devices over short distances (approx. 4 inches) by amplitude modulating a radio frequency field, which is received and interpreted by a reader or other NFC-capable device. In one example of NFC, an NFC-capable mobile phone may communicate with a near field communications capable reader or terminal to perform a contact less payment transaction.

As stated above, one type of application that may reside on a wireless smart device is a payment application. For example, a train ticket payment application may allow the user to pay for his or her train tickets by sending secure wireless signals from his or her NFC-enabled phone to a contactless wireless smart device reader. Other examples of wireless smart device applications include credit card payment applications, movie ticket payment applications, coupons, and stored value applications (e.g., university bucks).

In order to perform transactions using one of these applications, the wireless smart device must be provisioned with software and account information. Provisioning may occur via a wired or wireless interface. Provisioning over a wireless interface is also referred to as over the air (OTA) provisioning. As used herein, the term "OTA provisioning" refers to a process of downloading data or applications to a wireless device over a wireless or air interface. For example, OTA provisioning may include methods for distributing new software updates or configuration settings to wireless smart devices. OTA provisioning may include the use of wireless protocols, such as wireless application protocol (WAP) or multimedia messaging service (MMS) or Short messaging service (SMS), to send provisioning data or update packages for firmware or software updates to a wireless smart device so that the user does not have to give his or her device to an administrator to have the device provisioned.

In one example of a conventional transaction involving provisioning of a wireless smart device, the wireless smart device may include a payment application that converts "real" money into "virtual" money that can only be used at locations that accept the virtual money. This virtual money may include so called "university bucks" that may be used for, among other things, purchasing goods or services on a university campus. Thus, if the owner of the device with the university bucks application is also the owner of the bank account used to pay for the university bucks, then the owner/user can provide his or her bank account authentication information to the university bucks application to the purchase university bucks via an electronic funds transfer from the user's bank account. However, if the bank account owner is different from the university bucks application user (as would be the case when a parent owns the bank account used to fund a child's university bucks account), the bank account owner is required to provide his or her bank account authentication information to the university bucks application user in order for the user to replenish his or her university bucks account using the university bucks application. Providing online access to a bank account to the user of a wireless smart device may be undesirable if the bank account owner desires to limit or monitor access to his or her bank account.

Thus, one problem associated with conventional transactions involving provisioning of wireless smart devices is that there is no way using conventional methods to restrict or monitor access to accounts accessible via the devices once authentication information has been provided to device users. For example, a parent and a child may each have wireless smart devices. They each may have the university bucks application on their devices, but the child is only authorized to spend the university bucks. The parent may desire to be aware of each time the child needs to replenish the university bucks account. This is not possible using conventional methods where the parent relinquishes control over the parent's bank account by providing his child with the confidential information necessary to access the parent's bank account.

Accordingly, in light of the foregoing difficulties, there exists a need for improved systems, methods, and computer readable media for providing for secure offline account data transfer between wireless smart devices.

SUMMARY

According to one aspect of the subject matter described herein, a method for registering wireless smart devices for secure offline data transfer is provided. The method includes, for an application configured to execute on a wireless smart device and that requires access to information regarding an account that does not reside on the wireless smart device, register, at a server having access to the information regarding the account, a first wireless smart device has an account owner device (AOD) for operating in an online mode for obtaining the information regarding the account from the server and for operating in an offline mode for transferring the information regarding the account to at least one additional device via a secure offline data transfer using near field communications (NFC). The method further includes registering, at the server, at least one second wireless smart device as an account sharer device (ASD) for operating in an offline mode for receiving the information regarding the account from the first wireless smart device via the secure offline data transfer using NFC.

The subject matter described herein for providing for secure offline account data transfer between wireless smart devices may be implemented using a computer readable medium having stored thereon computer executable instructions that when executed by the processor of a computer perform the steps described herein for secure offline data transfer between wireless smart devices. Exemplary computer readable media suitable for implementing the subject matter described herein include disk memory devices, programmable logic devices, and application specific integrated circuits. In one implementation, the computer readable medium may include a memory accessible by a processor. The memory may include instructions executable by the processor for implementing any of the methods for secure offline data transfer between wireless smart devices described herein. In addition, a computer readable medium that implements the subject matter described herein may be distributed across multiple physical devices and/or computing platforms.

BRIEF DESCRIPTION OF THE DRAWINGS

Preferred embodiments of the subject matter described herein will now be explained with reference to the accompanying drawings of which.

DETAILED DESCRIPTION OF THE INVENTION

Figure 1:
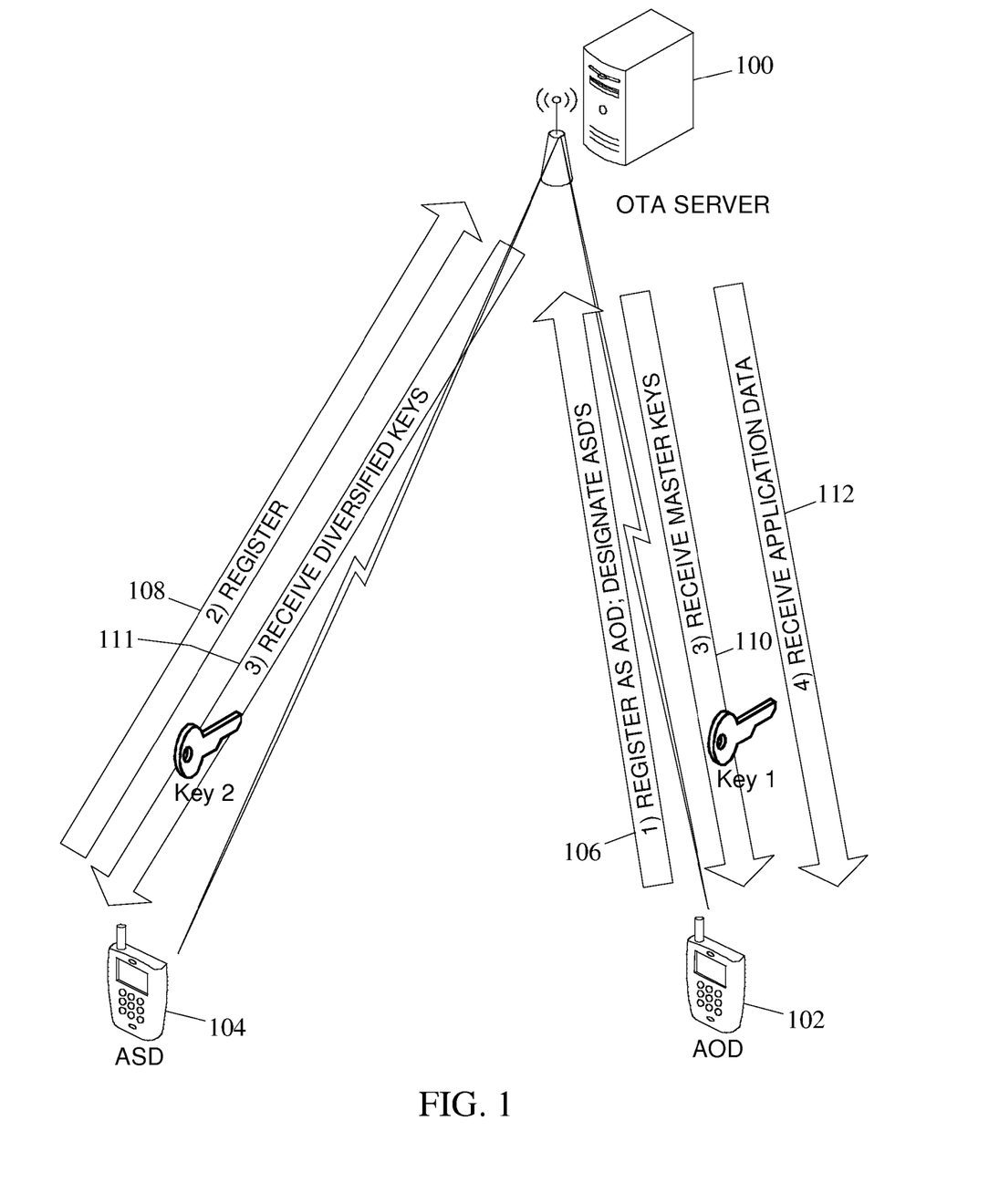
FIG. 1 is a network diagram illustrating an exemplary process and system for registering wireless smart devices for secure offline account data transfer according to an embodiment of the subject matter described herein.

FIG. 1 is a network diagram illustrating a process and a system for registering wireless smart devices for secure offline, account data transfer according to an embodiment of the subject matter described herein. Referring to FIG. 1, over-the-air (OTA) provisioning server 100 may communicate with one or more wireless smart devices for performing initial setup and registration. Initial setup and registration may include, for example, identifying one or more wireless smart devices as account owner devices (AODs) or account sharer devices (ASDs), providing each wireless smart device with security identifiers, and provisioning any necessary services.

For example, the owner of wireless smart device 102 may register with server 100 as the account owner device with respect to a particular application executing on wireless smart device 102, and the owner of wireless smart device 104 may register with server 100 as an account sharer device with respect to the same application. A device that is registered as the account owner device may be capable of operating in an online mode for obtaining information regarding an account from the server and for operating in an offline mode for transferring the data regarding the account to other wireless smart devices via near field communications. A device that is registered as an account sharer device may be capable of operating in the offline mode for receiving the account information from the account owner device but is restricted (i.e., communications 106, 110, and 112 are forbidden) from operating in the online mode for the particular application. Such a system allows the operator of the account owner device to provide access to account information without having to give account sharer devices online access to the account information.

Once wireless smart device 102 is registered as the AOD, server 100 may provision, via online access over an air interface, wireless smart device 102 with information for secure offline data transfer. The OTA provisioning performed by server 100 may occur using any suitable protocol. For example, OTA provisioning may include the use of any suitable wireless protocol or service, such as wireless application protocol (WAP) or multimedia messaging service (MMS), or embedded (https), to send the provisioning data. In one embodiment, OTA provisioning can be initiated by the user based upon an action, such as dialing a special telephone number associated with a service. For example, operator of server 100 may send a short message service (SMS) message to an account owner device specifying a service number to be dialed in order to receive provisioning data. Alternatively, provisioning may be performed automatically (i.e., initiated by the service provider). For example, provisioning data may be pushed to wireless smart devices 102 and 104 automatically without requiring the dialing of a special number.

Wireless smart devices 102 and 104 may be any of the wireless smart devices described above. In this example, it is assumed that wireless smart devices 102 and 104 are mobile phones with voice communications capabilities for voice calls and NFC capabilities for effecting NFC transactions. In addition to voice communications, wireless smart devices 102 and 104 may provide additional services, such as SMS, MMS, email, and data communications.

Figure 3:
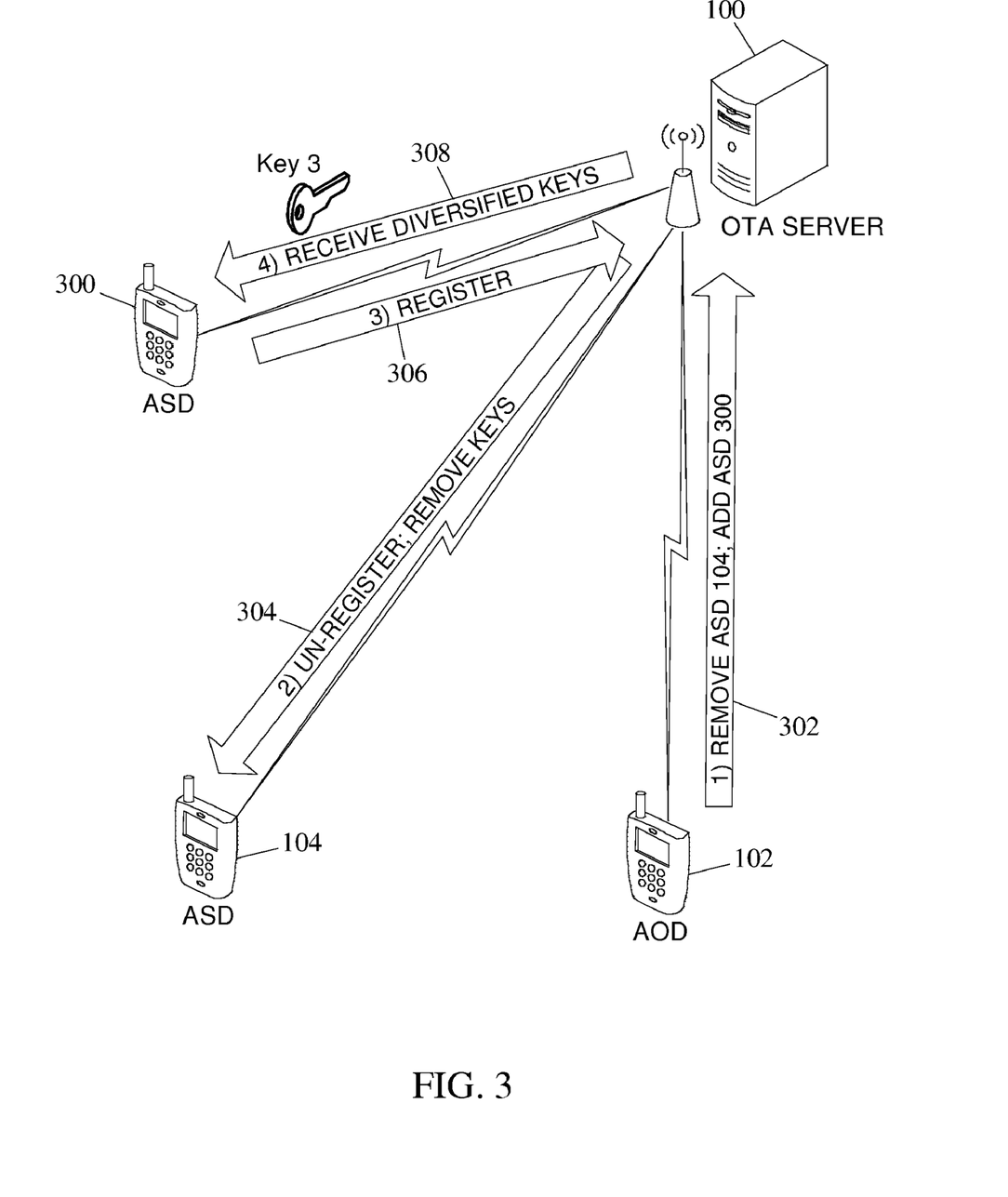
FIG. 3 is a network diagram illustrating an exemplary process and system for adding and removing wireless smart devices from an association with an account owner device after an initial registration period according to an embodiment of the subject matter described herein.

It is understood that the registration process illustrated in FIG. 3 could be repeated for different applications such that wireless smart device 102 could be an account sharer device and wireless smart device 104 could be an account owner device for a different application.

As part of the registration as account owner device, wireless smart device 102 may specify permitted account sharer devices. Alternatively, the owner of the account whose data is seeking to be accessed can designate permissible account owner devices and account sharer devices with OTA server 100 via any suitable means, such as a web based provisioning interface.

Referring to the message flow illustrated in FIG. 1, in step 106, wireless smart device 102 registers as an account owner device (AOD) indicating that device 102 has the sole authority to perform online transactions with server 100 and secure offline data transfers with other wireless smart devices, designated as account sharer devices (ASDs), for a particular application. For example, wireless smart device 102 may transmit a message to server 100 where the message may identify wireless smart device 100 (e.g., by equipment identifier), the application for which registration is sought (e.g. university bucks), and the type of registration sought (e.g., account owner device). Additionally, as part of the registration, one or more additional wireless smart devices may be designated as ASDs associated with AOD 102 in the message from wireless smart device 102. In one embodiment, during the registration process, the owner of an account that an application accesses during a transaction may provide the serial numbers of all wireless smart devices that are allowed to register as ASDs or AODs.

In the example illustrated in FIG. 1, wireless smart device 104 is designated the ASD associated with wireless smart device 102, which is functioning as an AOD. It is appreciated that wireless smart devices 102 and 104 may be designated as either an AOD or ASD on a per application basis. Therefore, the same wireless smart device may be an AOD for one application and an ASD for another application. In the example illustrated in FIG. 1, registration for a single application is illustrated.

Referring again to the message flow illustrated in FIG. 1, in step 108 wireless smart device 104 registers with server 100 for the particular application. Because wireless smart device 104 is designated as one of the permissible account sharer devices for wireless device 102 for the particular application, server 100 registers wireless smart device 104 as an account sharer device for the particular application.

Once wireless smart devices 102 and 104 are registered as account owner device and account sharer device, respectively, for the particular application, server 100 provides for secure offline data transfer from account owner device 102 to account sharer device 104. Providing for secure offline data transfer may include transmitting one or more cryptographic parameters to wireless smart devices 102 and 104. Referring again to the message flow illustrated in FIG. 1, in steps 110 and 111, server 100 may transmit one or more security identifiers, such as cryptographic parameters, to wireless smart devices 102 and 104, respectively, for secure offline communications. For example, it is appreciated that master key 1 may be received by AOD 102 in step 110 and that ASD 104 may receive diversified key 2 in step 111, where master key 1 and diversified key 2 are different. As used herein, the term "cryptographic parameter" refers to information used in a cryptographic algorithm or cipher. In this example, the cryptographic parameter may be an encryption key usable by each wireless smart device 102 and 104 in per application basis. As used herein, the term "cipher" refers to an algorithm for performing encryption and decryption operations for data. Exemplary ciphers include the data encryption standard (DES) and advanced encryption standard (AES) ciphers described in U.S. federal information processing standards (FIPS) publications 46-3 and 197, respectively, which are incorporated herein by reference in their entirety.

In step 112, wireless smart device 102 may receive account data from OTA server 100. For example, wireless smart device 102 may receive account data associated with a payment application, coupon application, voucher application, or electronic ticket application. The account data may be data that is directly redeemable for value to obtain to goods or services, as is the case with coupons, electronic tickets, or university bucks. In another example, the account data may be authentication information that is usable for limited access to an online account, such as a deposit account or a credit account. The limited access may be access that is limited by a credit limit or a withdrawal limit.

It is appreciated that while only a single AOD and ASD are shown, multiple ASDs may be associated with a particular AOD without departing from the scope of the subject matter described herein. However, within any association of AODs and ASDs, there may be only one AOD, which is responsible for designating ASDs, and is the only device capable of transmitting data to an ASD in a secure offline manner, which will be described in greater detail below with respect to FIG. 2.

Figure 2:
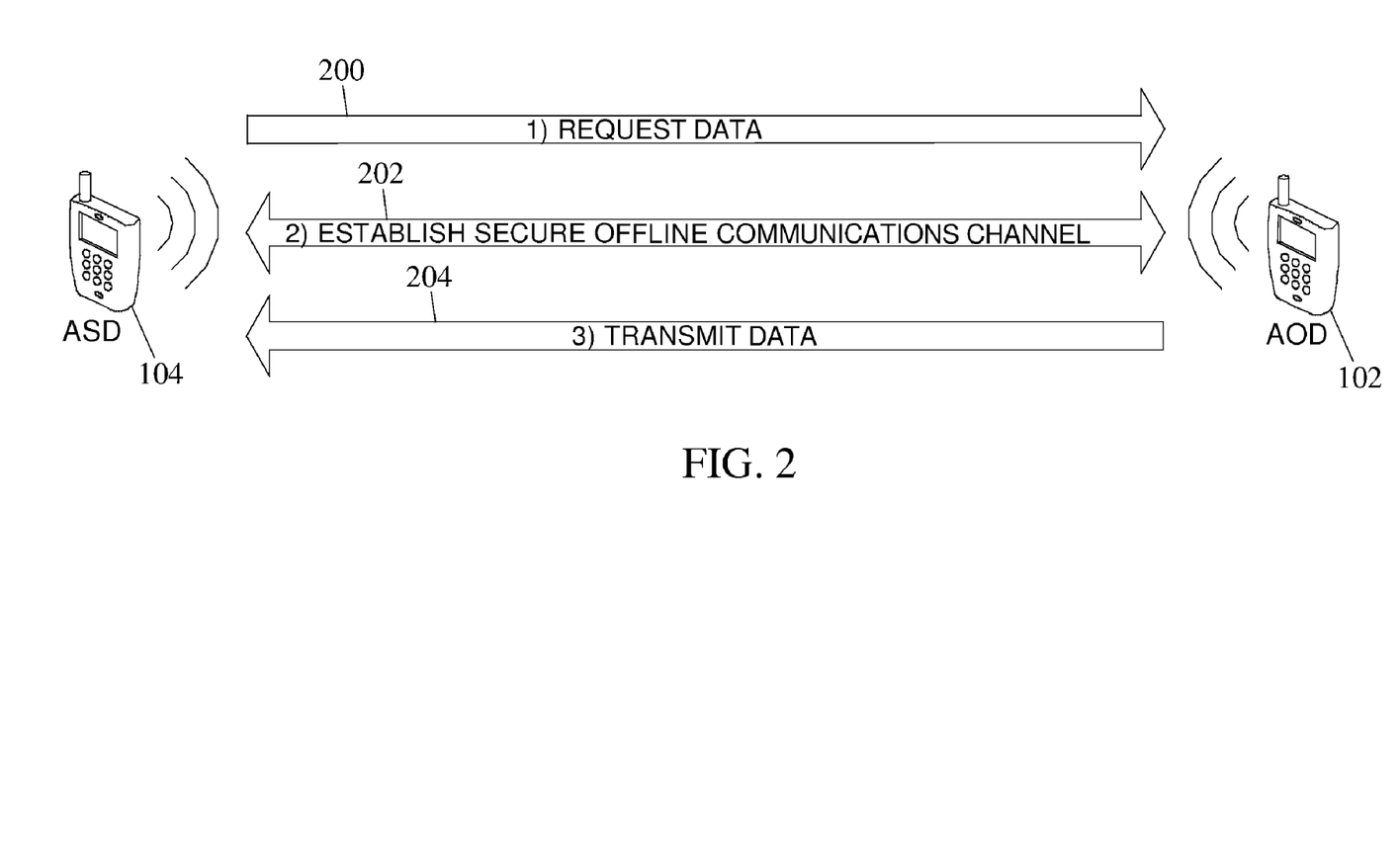
FIG. 2 is a network diagram illustrating an exemplary process and system for performing secure offline account data transfer between wireless smart devices according to an embodiment of the subject matter described herein.

FIG. 2 is a network diagram illustrating an exemplary process for transferring data between wireless smart devices in an offline secure manner according to an embodiment of the subject matter described herein. Referring to FIG. 2, wireless smart device 104 is located in physical proximity to wireless smart device 102 such that near field communications are possible. It is appreciated that for a particular application for which a wireless smart device has been designated an ASD, the designated ASD may not communicate with OTA server 100 to obtain account information, even though the same application that executes on a wireless smart device designated as the AOD can access the information in an online mode from server 100. A wireless smart device that is designated as the ASD can only obtain the account information by requesting the information from the AOD associated with the particular application.

Referring to the exemplary message flow illustrated in FIG. 2, in step 200, ASD 104 requests account data from AOD 102. For example, within the context of a university bucks application, ASD 104 may request a transfer of virtual money (i.e., university bucks) when his or her account is low. It is appreciated that depending on the type of data and/or application, request 200 may or may not be anonymous. In the case of an anonymous request, the data can be used by any ASD associated with AOD 102. Alternatively, for non-anonymous requests (i.e., serial number-based) only a single pre-identified and authenticated ASD can use the data. It is appreciated that while the embodiment shown in FIG. 2 illustrates ASD 104 initiating a transaction with AOD 102, other embodiments including, but not limited to, AOD 102 being configured to initiate a transaction with ASD 104 may also be implemented without departing from the scope of the subject matter described herein.

In step 202, the secure offline communications channel is established. The communications medium that is used may be an air interface medium using near field communications. In order to provide a secure communications channel between a wireless smart device and one of a wireless smart device reader, server, or another wireless smart device over an NFC interface, various cryptographic methods and systems may be used. In order to convert unencrypted data into encrypted data, and back again, one or more cryptographic keys and associated algorithms may be used. It is appreciated that a different key may be associated with each of wireless smart devices 102 and 104 per application. Any suitable public key or secret key cryptographic algorithm may be used for the secure offline data transfer. Exemplary public and secret key algorithms that may be used will now be described.

Public-key cryptography, also known as asymmetric cryptography, uses a pair of cryptographic keys—a public key and a private key, so that the key used to encrypt a message differs from the key used to decrypt it. The private key is kept secret, while the public key may be widely distributed. Messages encrypted with the public key and can only be decrypted with the corresponding private key. It is appreciated that while the public and private keys are related mathematically, the private key cannot be derived from the public key. As a result, a secure communications channel may be created through the use of public/private key pairs. In the example illustrated in FIG. 2, wireless smart device 102 may encrypt the account data with the public key of wireless smart device 104 for the particular application, and wireless smart device 104 may decrypt the account data using the private key of wireless smart device 104 for the particular application.

In addition to the scenario described above for ensuring confidentiality, public key encryption may also use digital signatures for ensuring authenticity. For example, a message signed with a sender's private key can be verified by anyone who has access to the sender's public key, thereby ensuring that the message has not been altered during transmission. In the example illustrated in FIG. 2, wireless smart device 102 may sign the account data with the private key of wireless smart device 102 so that the data can be verified by wireless smart device 104 using the public key of wireless smart device 102.

Alternatively, secret key cryptography, also known as symmetric cryptography, uses a single secret key for both encryption and decryption. In secret key cryptography, both sender and receiver must know the secret key in order to exchange information. For example, AOD 102 may dynamically define diversified secret keys for ASD 104 using a combination of a predetermined algorithm and its private master keys 110, wherein keys 110 and 111 associated with AOD 102 and ASD 104, respectively, are different). In FIG. 2, server 100 may distribute the shared secret key to devices 102 and 104, and the devices may use the shared secret key to encrypt and decrypt the information for the secure offline data transfer.

Returning to the message flow illustration in FIG. 2, in step 204, account data may be transmitted from AOD 102 to ASD 104 using the secure offline communications channel. Continuing the example described above, AOD 102 may transfer an amount of university bucks to ASD 104. This data may include, for example, an authorization code for using up to the transferred amount. By limiting the ability of ASD 104 to use a particular application for connecting to OTA server 100, AOD 102 may be ensured of maintaining control over ASD 104's access to OTA provisioning server 100 for a particular application.

FIG. 3 is a network diagram illustrating an exemplary process for adding and removing a wireless smart device after an initial registration period according to an embodiment of the subject matter described herein. Referring to FIG. 3, wireless smart devices 102 and 104 have previously been designated as AOD and ASD, respectively, during initial setup/registration. Thereafter, additional ASDs may be designated and/or existing ASDs may be removed from their association with a particular AOD at the instruction of AOD 102. For example, in step 302, wireless smart device 102 may instruct OTA server 100 to remove wireless smart device 104 as an ASD and designate (i.e., add) wireless smart device 300 as an ASD. This may include connecting to server 100 and typing/sending, in real-time, the serial number of the ASD to be added or removed.

In response to receiving instructions to un-register wireless smart device 104, in step 304, server 100 may un-register wireless smart device 104 and disassociate (i.e., remove) its cryptographic keys. As a result, wireless smart device 104 may no longer be designated as an ASD associated with AOD 102 for a particular application and therefore be prohibited from receiving account data from AOD 102 in a secure offline manner.

In step 306, wireless smart device 300 may confirm its status as an ASD by registering with server 100. Thereafter, in step 308, server 100 may issue one or more cryptographic keys, which may be received by wireless smart device 300 and used for securely communicating in an offline manner with wireless smart device 102, such as via NFC. For example, key 3 received by ASD 300 in step 308 may be a diversified key that is different from master key 1 received in step 110 of FIG. 1 by AOD 102.

Figure 4:
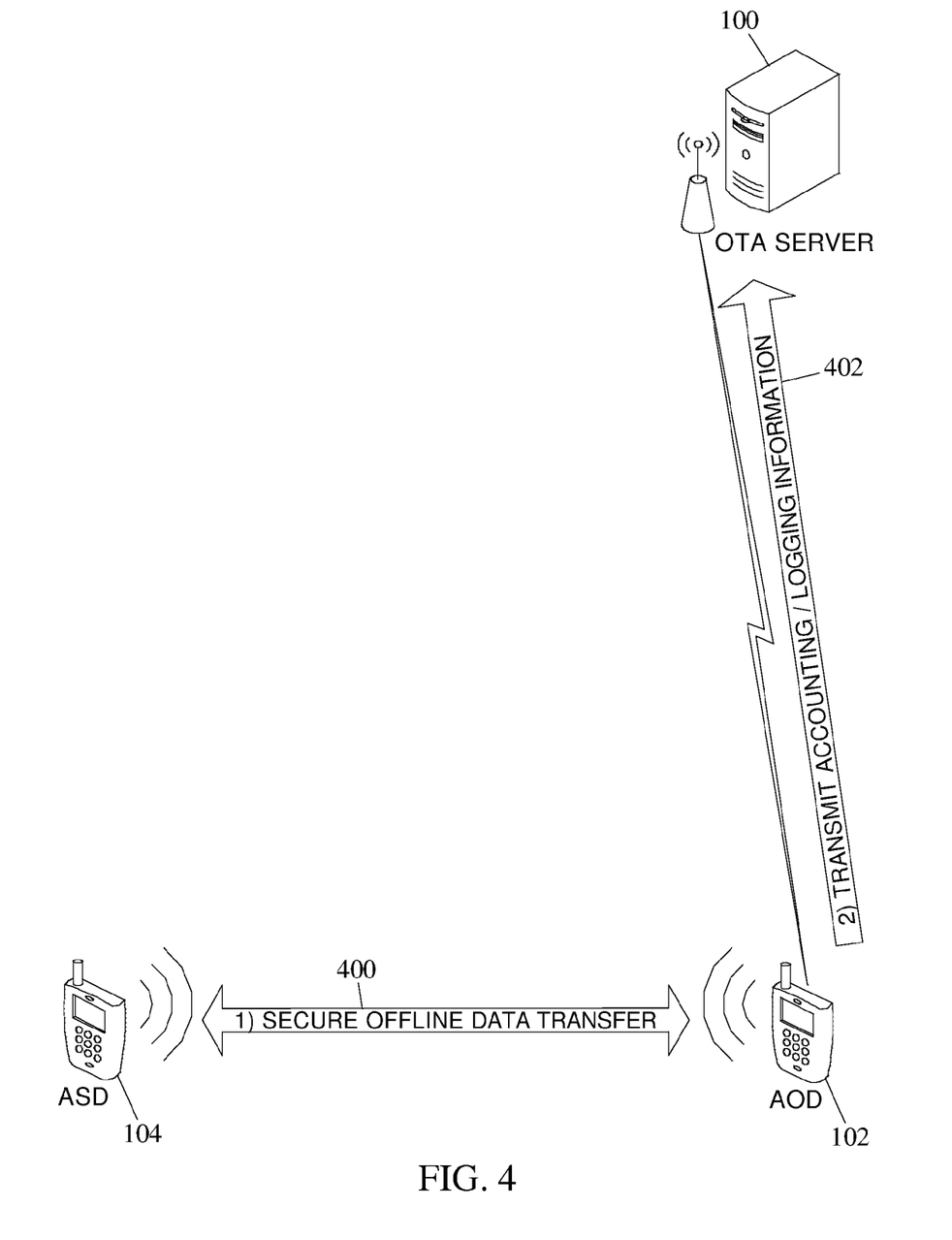
FIG. 4 is a network diagram illustrating transmitting logging and accounting information associated to an OTA server in a secure offline manner for a wireless data transfer according to an embodiment of the subject matter described herein.

FIG. 4 is a network diagram illustrating exemplary devices and steps for providing logging and/or accounting information associated with a wireless data transfer according to an embodiment of the subject matter described herein. Referring to FIG. 4, accounting and logging information may be sent to a mobile network operator (MNO) after a secure offline data transfer. For example, after secure offline data transfer session 400 between wireless smart devices 102 and 104, wireless smart device 102 may transmit accounting (i.e., a certificate of transfer to ASD 104) and logging information 402 to OTA server 100. Accounting and logging information 402 may include information associated with identifying, measuring or communicating economic or statistical information, and may include events automatically recorded relating to any desired metric. For example, accounting and logging information 402 may include billing information, completed data transfers, attempted data transfers, application identifiers, timestamps, and service information. Additionally, each secure offline data transfer between wireless smart devices 102 and 104 may generate a cryptography certificate that can be sent back to server 100 for accounting or logging purposes. It is appreciated that while accounting and logging information 402 is transmitted by AOD 102 in the embodiment shown in FIG. 4, accounting and logging information 402 may also be transmitted by ASD 104 to server 100 in other embodiments without departing from the scope of the subject matter described herein.

Figure 5:
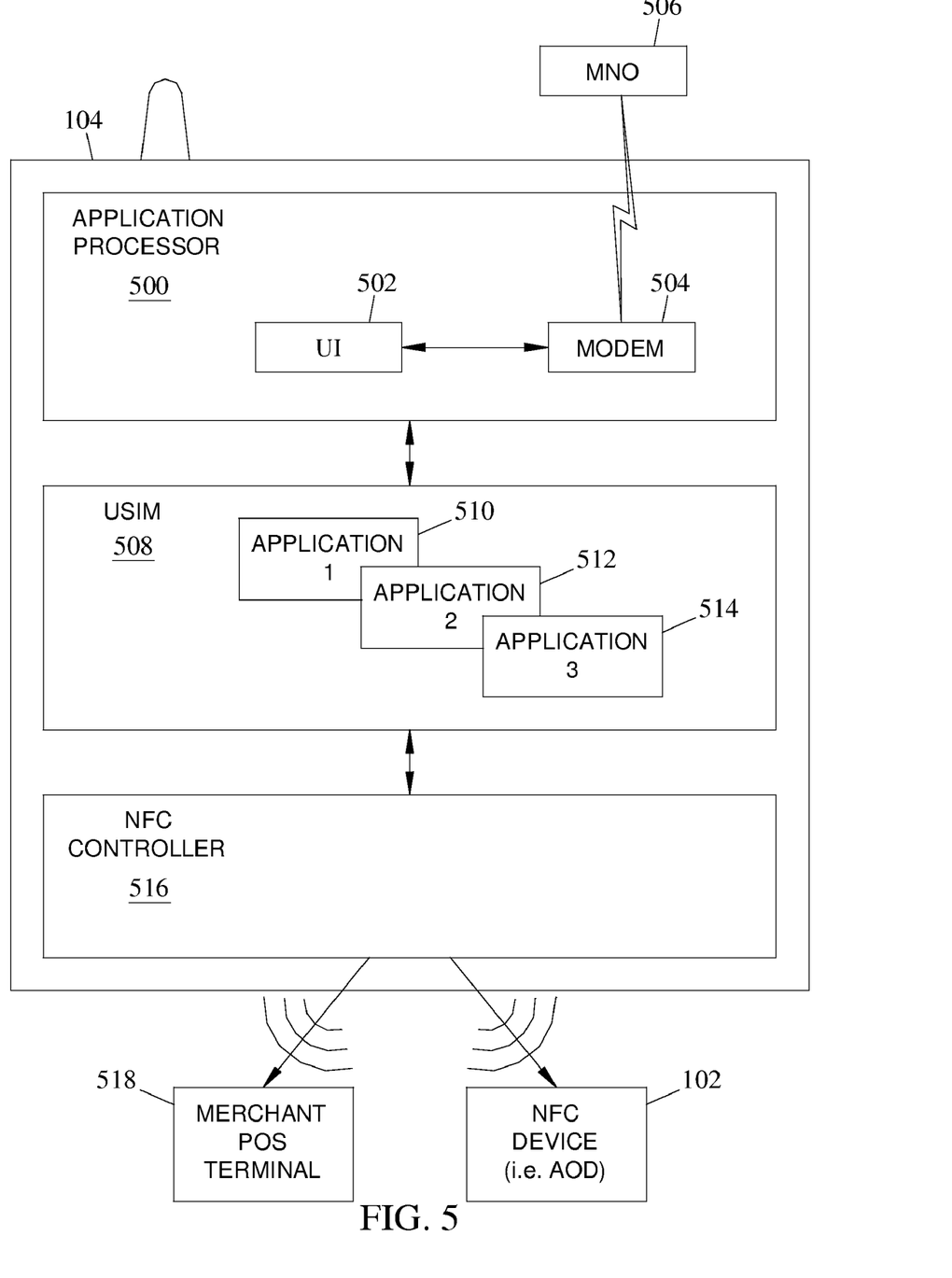
FIG. 5 is an internal architecture diagram of a wireless smart device according to an embodiment of the subject matter described herein.

FIG. 5 is an internal architecture diagram of a wireless smart device according to an embodiment of the subject matter described herein. Referring to FIG. 5, wireless smart device 102 may be any suitable wireless smart device capable of communicating with an OTA server and other wireless smart devices via NFC, as well as being capable of being designated as an AOD or ASD on a per application basis. Wireless smart device 102 may include an application processor 500 for performing various tasks such as receiving input from the user, managing communications with server 100, and displaying a user interface. For example, user interface (UI) 502 may include software instructions executed by application processor 500 for allowing the user to interact with wireless smart device 102. This may include receiving input from a keypad (not shown) and displaying information on a display (not shown). In addition to UI 502, modem 504 may be associated with application processor 500 for communicating with MNO 506. Modem 504 may include a hardware modem, software modem, or a combination thereof. MNO 506 may include any suitable network operator that provides services to mobile subscribers. For example, MNO 506 may include server 100 operated by a cellular telephone service provider for provisioning wireless smart device 102 via GSM or UMTS networks. Because communications with server 100 includes accessing a remote communications network, communications between modem 504 and MNO 506 are said to be performed online.

A universal integrated circuit card (UICC) is an electronic chip card used in mobile devices for ensuring the integrity and security of personal data. For example, a UICC may include a central processing unit (CPU), read only memory (ROM), random access memory (RAM), electronically erasable programmable read only memory (EEPROM), and input/output (I/O) circuits.

A UICC may contain several applications. For example, in a global system for mobile communications (GSM) network, a UICC may contain a SIM application, while in a universal mobile telecommunications system (UMTS) network the UICC may contain a universal SIM (USIM) application.

A subscriber identity module (SIM) card is a used in GSM mobile phones to identify the user for billing and other services securely store the service-subscriber key (IMSI) used to identify a subscriber. The use of SIM cards is mandatory in GSM devices.

A USIM is an application for performing UMTS mobile telephony functions being stored on a UICC smart card typically inserted into a wireless smart device, such as a 3G mobile phone. Thus, USIM 508 may include a logical entity stored on a physical card, such as a UICC. For example, USIM 508 may store subscriber information, authentication information, text messages, and contact information.

USIM 508 may include one or more applications for providing different services. In FIG. 5, USIM 508 includes applications 510, 512, and 514 including, for example, a University Bucks application as described above. One type of application that may exist on a wireless smart device is a contactless application based on MIFARE® specifications. MIFARE® is a standard that defines protocols and memory storage format for applications on wireless smart devices. The MIFARE® standard can support a wide range of applications such as contactless payment, loyalty, public transportation, ticketing, coupon, access control, and gaming. The MIFARE® standard conforms to some, but not all, of the 14443 specification.

Although there are some differences between a SIM and USIM, as used herein, the term "SIM" refers to either a SIM or USIM application. Also, although it is common to use the terms SIM, USIM, and UICC interchangeably, a SIM is an application (e.g., software or firmware) that executes on the UICC hardware. Thus, as used herein, the term "UICC" refers to hardware, while the term "SIM" refers to an application running on that hardware.

NFC controller 516 may include any suitable hardware or software for communicating with other NFC-enabled devices using NFC. NFC controller 516 may include, for example, ROM, RAM, a power supply, antenna, and an RF interface for communicating with other devices via NFC. As described above, NFC enables the exchange of data between devices over short distances (approx. 4 inches) by amplitude modulating a radio frequency field, which is received and interpreted by other NFC-capable devices. NFC is an open platform technology standardized in ECMA-340 and ISO/IEC 18092, and incorporates a variety of pre-existing standards including ISO 14443 (A and B), ISO 15693, and FeliCa, which are incorporated herein by reference in their entirety.

Merchant point of sale (POS) terminal 518 may include, for example, a wireless device reader, cash register, keypad, and display. Wireless device reader may include any reader is capable of reading wireless smart cards, NFC enabled mobile devices, or any other contactless payment type device. In one embodiment, wireless device reader included in merchant POS terminal 518 may wirelessly communicate with NFC-enabled wireless smart device 104 via NFC.

Figure 6:
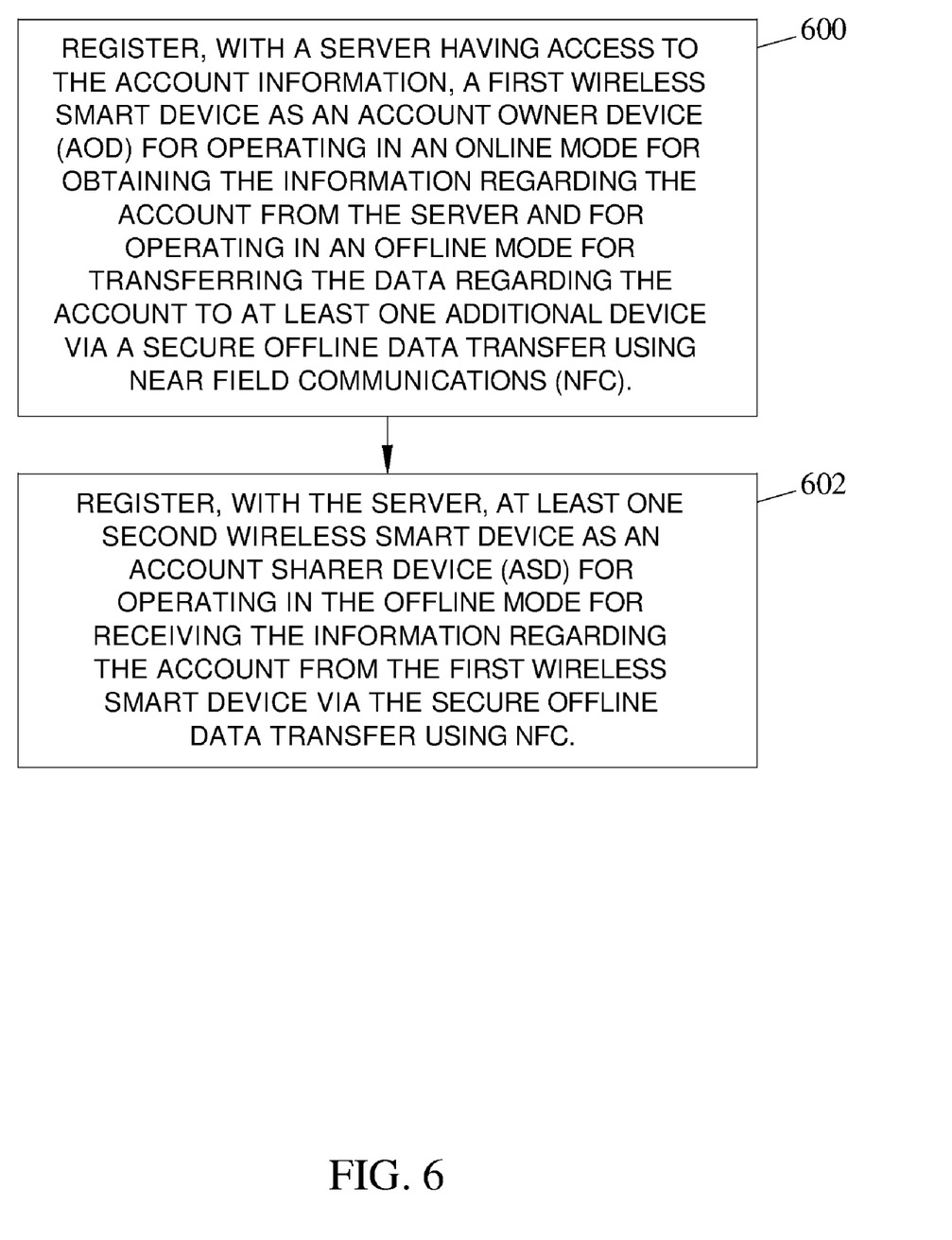
FIG. 6 is a flow chart of exemplary steps for providing for secure offline account data transfer between wireless smart devices according to an embodiment of the subject matter described herein.

FIG. 6 is a flow chart of exemplary steps for providing for secure offline account data transfer between wireless smart devices according to an embodiment of the subject matter described herein. Referring to FIG. 6, at an application configured to execute on a wireless smart device and that requires access to information regarding an account that does not reside on the wireless smart device, the following steps are performed.

In block 600, a first wireless smart device is registered as an account owner device (AOD) with a server having access to the account information, wherein the AOD operates in an online mode for obtaining the information regarding the account from the server and operates in an offline mode for transferring the data regarding the account to at least one additional device via a secure offline data transfer using near field communications (NFC).

In block 602, at least one second wireless smart device is registered as an account sharer device (ASD) with the server, wherein the ASD operates in the offline mode for receiving the information regarding the account from the first wireless smart device via the secure offline data transfer using NFC.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for registering wireless smart devices for secure offline data transfer, the method comprising:
    for an application configured to execute on a wireless smart device and that requires access to information regarding an account that does not reside on the wireless smart device:
    sending a registering message, to a server having access to the information regarding the account, a first wireless smart device as an account owner device (AOD) for operating in an online mode for obtaining the information regarding the account from the server and for operating in an offline mode for transferring the information regarding the account to at least one additional device via a secure offline data transfer using near field communications (NFC), wherein the registering message includes a designation by the owner of the account identification of the first wireless smart device as AOD, identification of the application and identification of the at least one additional device as account sharer devices (ASDs) associated with the first wireless smart device;
    in response to registering the first wireless smart device as the account owner device, granting, at the server, only the first wireless smart device access to the account information from the server;
    sending another registering message, to the server, using the at least one second wireless smart device as an account sharer device (ASD) for operating in the offline mode for receiving the information regarding the account from the first wireless smart device only via the secure offline data transfer using NFC from the first wireless device;
    in response to registering using the first wireless smart device and the at least second wireless smart device, the server transmitting a master key to the first wireless smart device and a diversified key that is different from the master key to the second wireless smart device to enable secure offline communication using NFC; and
    in response to registering the at least one second wireless smart device as the account sharer device, preventing, at the server, the at least one second wireless smart device from accessing the information regarding the account via the online mode, wherein preventing the at least one second wireless smart device from accessing the information regarding the account via the online mode does not prevent the at least one second wireless smart device from receiving the information regarding the account from the first wireless smart device via the secure offline data transfer using NFC.

2. The method of claim 1 wherein the server comprises an over the air provisioning server for provisioning the first and the at least one second wireless smart device via an air interface.

3. The method of claim 2 wherein registering the first and the at least one second wireless smart devices with the server includes transmitting messages from the wireless smart devices to the server via the air interface.

4. The method of claim 1 comprising, at the server, in response to receiving an unregister message from the first wireless smart device, unregistering the at least one second wireless smart device as account sharer device for the particular application.

5. The method of claim 1 comprising, transmitting, from the server, parameters for providing for the secure offline data transfer between the first and the at least one second wireless smart device.

6. The method of claim 5 wherein transmitting parameters from the server includes transmitting cryptographic parameters to the first and the at least one second wireless smart device.

7. A system for secure offline data transfer between wireless smart devices, the system comprising:
a first application configured to execute on a plurality of wireless smart devices;
a server configured to:
register a first wireless smart device as an account owner device (AOD) for operating in an online mode for obtaining the information regarding the account from the server and for operating in an offline mode for transferring the information regarding the account to at least one additional device via a secure offline data transfer using near field communications (NFC), wherein the first wireless device transmits a registration message including a designation by the owner of the account identification of the first wireless smart device as AOD, identification of the application and identification of the at least one additional device as account sharer devices (ASDs) associated with the first wireless smart device;
register a second wireless smart device as an account sharer device (ASD) for operating in the offline mode for receiving the information regarding the account from the first wireless smart device only via the secure offline data transfer using NFC from the first wireless device; and
in response to registering the first wireless smart device and the second wireless smart device, transmit a master key to the first wireless smart device and a diversified key that is different from the master key to the second wireless smart device to enable secure offline communication using NFC;
the first wireless smart device for operating as an account owner device in the context of the first application executing on the first wireless smart device, wherein operating as the account owner device includes operating in an online mode to obtain account information and providing the account information to the at least one additional device via the offline mode of operation using near field communications (NFC), wherein only the first wireless smart device is allowed access to the information regarding the account via the online mode from the server; and
the second wireless smart device for operating as an account sharer device in the context of the first application, a copy of which executes on the second wireless smart device, wherein operating as an account sharer device includes requesting and receiving the account information from the first wireless smart device only via a secure offline data transfer from the first wireless smart device using near field communications, wherein the second wireless smart device is prevented from accessing the information regarding the account via the online mode, and wherein preventing the second wireless smart device from accessing the information regarding the account via the online mode does not prevent the second wireless smart device from receiving the information regarding the account from the first wireless smart device via the secure offline data transfer using near field communications.

8. The system of claim 7 wherein the first wireless smart device functions as an account sharer device and the second wireless smart device functions as an account owner device in the context of a second application.

9. The system of claim 7 wherein the first application comprises a contactless payment application.

10. The system of claim 7 wherein the first and second wireless smart devices obtain encryption parameters from a server for the secure offline data transfer.

11. The system of claim 7 comprising a server with which the first and second wireless smart devices register, respectively, as account owner device and account sharer device.

12. The system of claim 11 wherein the server allows a plurality of wireless smart devices to register as account sharer devices for sharing data with the first wireless smart device in the offline mode in the context of the first application.

13. The system of claim 11 wherein the first wireless smart device unregisters the second wireless smart device as an account sharer device by sending an unregister message to the server.

14. A non-transitory computer readable medium having stored thereon computer executable instructions that when executed by a processor of a computer performs steps comprising:
for an application configured to execute on a wireless smart device and that requires access to information regarding an account that does not reside on the wireless smart device:
sending a registering message, to a server having access to the information regarding the account, a first wireless smart device as an account owner device (AOD) for operating in an online mode for obtaining the information regarding the account from the server and for operating in an offline mode for transferring the information regarding the account to at least one additional device via a secure offline data transfer using near field communications (NFC), wherein the registering message includes a designation by the owner of the account identification of the first wireless smart device as AOD, identification of the application and identification of the at least one additional device as account sharer devices (ASDs) associated with the first wireless smart device;
in response to registering the first wireless smart device as the account owner device, granting, at the server, only the first wireless smart device access to the account information from the server;
sending another registering message, to the server, using the at least one second wireless smart device as an account sharer device (ASD) for operating in the offline mode for receiving the information regarding the account from the first wireless smart device only via the secure offline data transfer using NFC from the first wireless device;
in response to registering using the first wireless smart device and the at least second wireless smart device, the server transmitting a master key to the first wireless smart device and a diversified key that is different from the master key to the second wireless smart device to enable secure offline communication using NFC; and in response to registering the at least one second wireless smart device as the account sharer device, preventing, at the server, the at least one second wireless smart device from accessing the information regarding the account via the online mode, wherein preventing the at least one second wireless smart device from accessing the information regarding the account via the online mode does not prevent the at least one second wireless smart device from receiving the information regarding the account from the first wireless smart device via the secure offline data transfer using NFC.

* * * * *